United States Patent
Malinovskiy et al.

(10) Patent No.: US 10,209,346 B2
(45) Date of Patent: Feb. 19, 2019

(54) DISPERSION CORRECTION FOR FMCW RADAR IN A PIPE OR TUBE

(71) Applicant: Endress + Hauser GmbH + Co. KG, Maulburg (DE)

(72) Inventors: Alexey Malinovskiy, Maulburg (DE); Stefan Pfluger, Munich (DE); Winfried Mayer, Buch (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 400 days.

(21) Appl. No.: 14/910,786

(22) PCT Filed: Jul. 8, 2014

(86) PCT No.: PCT/EP2014/064572
§ 371 (c)(1),
(2) Date: Feb. 8, 2016

(87) PCT Pub. No.: WO2015/018586
PCT Pub. Date: Feb. 12, 2015

(65) Prior Publication Data
US 2016/0202347 A1 Jul. 14, 2016

(30) Foreign Application Priority Data

Aug. 7, 2013 (DE) .................. 10 2013 108 490

(51) Int. Cl.
*G01S 7/35* (2006.01)
*G01S 7/40* (2006.01)
(Continued)

(52) U.S. Cl.
CPC ............ *G01S 7/352* (2013.01); *G01F 23/284* (2013.01); *G01S 7/354* (2013.01); *G01S 7/40* (2013.01); *G01S 13/343* (2013.01); *G01S 13/88* (2013.01)

(58) Field of Classification Search
CPC . G01S 7/352; G01S 7/354; G01S 7/40; G01S 13/88; G01S 13/343; G01F 23/284
(Continued)

(56) References Cited

U.S. PATENT DOCUMENTS 6,054,946 A   4/2000  Lalla et al.
6,415,660 B1  7/2002  Sinz et al.
(Continued)

FOREIGN PATENT DOCUMENTS

CN   101031814 A   9/2007
CN   101052892 A   10/2007
(Continued)

OTHER PUBLICATIONS

English Translation of International Preliminary Report on Patentability, WIPO, Geneva, dated Feb. 18, 2016.
(Continued)

*Primary Examiner* — Frank J McGue
(74) *Attorney, Agent, or Firm* — Bacon & Thomas, PLLC

(57) ABSTRACT

A radar measurement apparatus works according to the FMCW principle and includes a radar transmission unit, and a radar receiving unit, which is designed to receive a radar received signal reflected on a surface of the medium or other target in a pipe or tube, to convert the received signal into an intermediate frequency signal by mixing with the transmission signal, or a signal derived therefrom, and based on an intermediate signal to determine distance to the surface of the medium or other target. The radar receiving unit applies a phase correction to the intermediate signal produces a phase corrected, intermediate frequency signal, wherein the phase correction lessens or removes a dispersion dependent phase fraction in the phase of the intermediate signal and adds a non-dispersion effects dependent phase fraction. The radar receiving unit is designed based on the phase corrected
(Continued)

intermediate signal to determine the target frequency components in the intermediate frequency signal and based on the target frequency components to determine distance to the surface of the medium or other radar.

21 Claims, 8 Drawing Sheets

(51) Int. Cl.
  *G01S 13/34* (2006.01)
  *G01S 13/88* (2006.01)
  *G01F 23/284* (2006.01)
(58) Field of Classification Search
  USPC .......................................................... 342/124
  See application file for complete search history.

(56) References Cited

U.S. PATENT DOCUMENTS

| | | |
|---|---|---|
| 7,592,943 B2 | 9/2009 | Beasley |
| 7,764,221 B2 | 7/2010 | Voigtlaender |
| 8,040,274 B2 | 10/2011 | Wendler et al. |
| 9,645,003 B2 * | 5/2017 | Malinovskiy ......... G01F 23/284 |
| 2008/0088503 A1 | 4/2008 | Beasley |
| 2010/0070207 A1 | 3/2010 | Sai |

FOREIGN PATENT DOCUMENTS

| | | |
|---|---|---|
| CN | 101666874 A | 3/2010 |
| CN | 101957446 A | 1/2011 |
| DE | 102006030965 A1 | 1/2008 |
| EP | 0955528 A1 | 11/1999 |
| EP | 2302338 A1 | 3/2011 |

OTHER PUBLICATIONS

International Search Report,, EPO, The Netherlands, dated Sep. 25, 2014.
German Search Report, German PTO, Munich, dated Mar. 26, 2014.
"FMCW-Radarsensoren bei 24 GHz in planarem Aufbau zur Fullstandsmessung," M. Nalezinski, Dissertation, University of Bundeswehr, Munich, Germany, Feb. 20, 2003, 7 pp. in Germam.

* cited by examiner

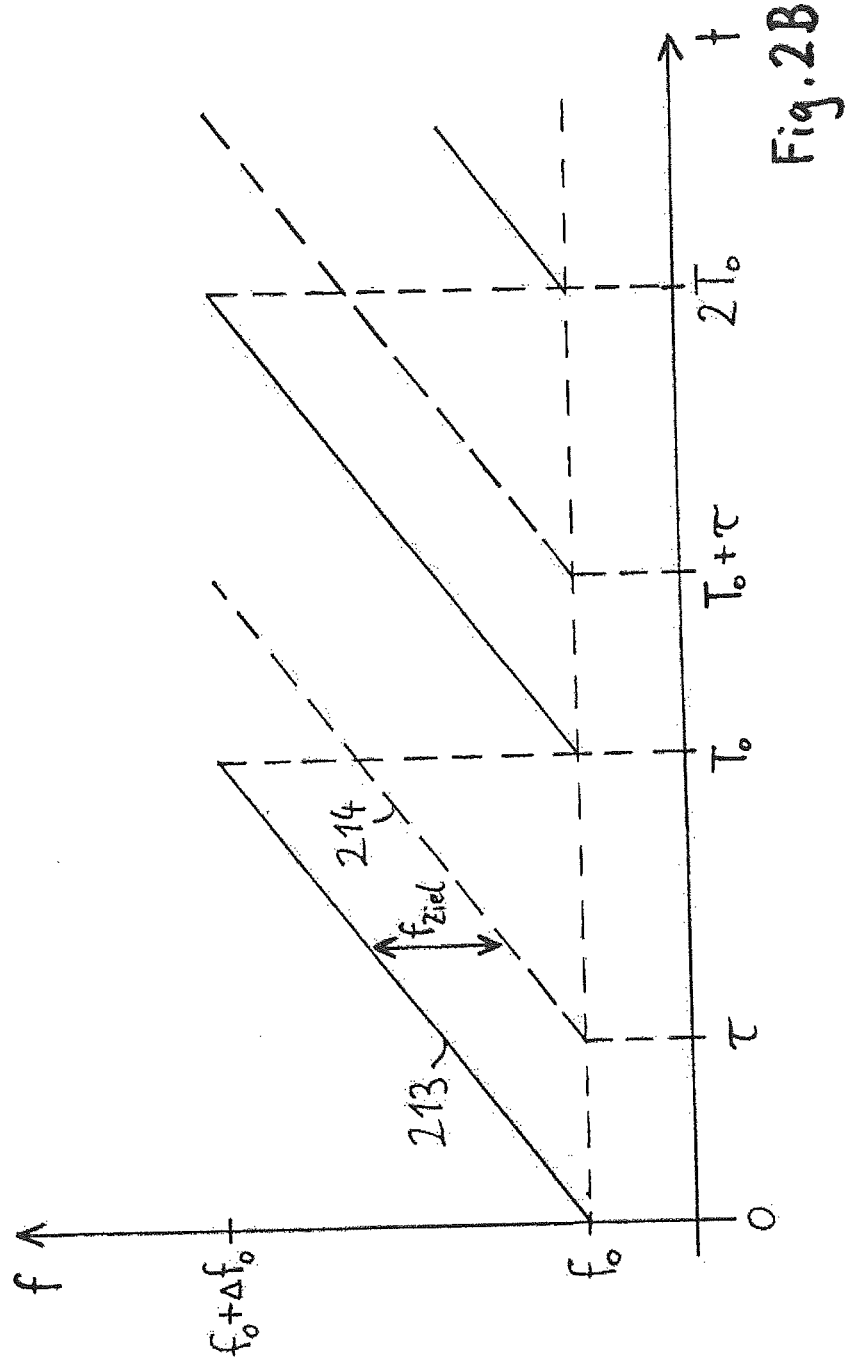

DISPERSION CORRECTION FOR FMCW RADAR IN A PIPE OR TUBE

TECHNICAL FIELD

The invention relates to a radar measurement apparatus for determining distance to a surface of a medium or distance to another radar target in a pipe or tube, as such radar measurement apparatus is defined in the preamble of claim 1. Furthermore, the invention relates to a method for determining distance to a surface of a medium or distance to another radar target in a pipe or tube by means of a radar measurement apparatus, which works according to the principle of FMCW radar.

BACKGROUND DISCUSSION

In process automation technology, field devices are often applied, which serve for registering and/or influencing process variables. Examples of such field devices are fill level measuring devices, mass flow measuring devices, pressure- and temperature measuring devices, etc., which as sensors register the corresponding process variables, fill level, flow, pressure, and temperature, respectively.

Referred to as field devices are, in principle, all devices, which are applied near to the process and deliver, or process, process relevant information.

A large number of such field devices are produced and sold by the firm, Endress+Hauser.

The fill level in a container or tank can be exactly measured with the help of radar measurement apparatuses based on FMCW radar. In the case of radar measurement in a pipe or tube, however, special effects occur, because the pipe or tube acts as a hollow conductor for the radar waves. Propagation of radar waves is different in hollow conductors.

SUMMARY OF THE INVENTION

An object of the invention is, consequently, to improve the accuracy of distance measurement by means of radar in a pipe or tube.

A radar measurement apparatus for determining distance to a surface of a medium or distance to another radar target in a pipe or tube works according to the FMCW principle and includes a radar transmission unit, which is designed to produce a radar transmission signal, which is frequency modulated according to the FMCW principle, and a radar receiving unit, which is designed to receive a radar received signal reflected on the surface of the medium or other radar target back in the pipe or tube, to convert the radar received signal by mixing with the radar transmission signal, or a signal derived therefrom, into an intermediate frequency signal and based on the so obtained intermediate signal to determine distance to the surface of the medium or to the other radar target in the pipe or tube. The radar receiving unit is designed to apply a phase correction to the phase of the intermediate signal and to produce a phase corrected intermediate frequency signal, wherein the phase correction is designed to lessen or to remove a dispersion dependent phase fraction in the phase of the intermediate signal and to add a phase fraction not dependent on dispersion effects. The radar receiving unit is designed based on the phase corrected intermediate signal to determine target frequency components in the intermediate frequency signal and based on the target frequency components to determine distance to the surface of the medium or distance to another radar target in the pipe or tube.

By applying the phase correction, the effects arising in the case of wave propagation in a pipe or tube as a result of dispersion are lessened or eliminated, while supplementally a non-dispersive phase fraction linearly rising with time is added by the phase correction. As a result of the phase correction, the target frequency components contained in the intermediate frequency signal can be better and more exactly evaluated than previously. Especially, the phase correction prevents a broadening and a distancing of the different frequency peaks in the frequency spectrum of the intermediate signal from one another. The frequency peaks are sharper and can be more exactly evaluated.

BRIEF DESCRIPTION OF THE DRAWINGS

The invention will now be explained in greater detail based on a number of examples of embodiments presented in the drawing, the figures of which show as follows:

FIG. 2B frequency as a function of time for transmitted and received signals;

DETAILED DESCRIPTION IN CONJUNCTION WITH THE DRAWINGS

Principle of Fill Level Measurement in a Pipe or Tube by Means of Radar

Figure 1A:
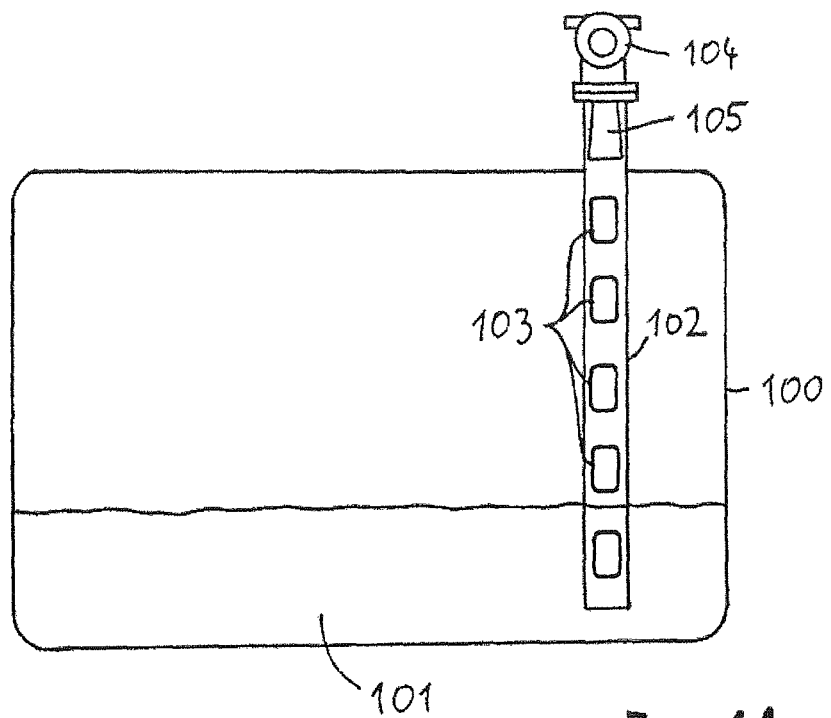
FIG. 1A a tank with a sounding tube and a radar measuring device for performing a fill level measurement in the sounding tube.

FIG. 1A shows a tank 100, which is partially filled with a medium 101. Arranged in the tank 100 is a vertical sounding tube 102, which protrudes into the medium 101. The medium 101 can be, for example, a liquid; it can, however, also be a flowable bulk good. The sounding tube 102 is open at its lower end. Moreover, the wall of the sounding tube 102 includes a number of windows 103, so that the fill level of the medium 101 in the interior of the sounding tube 102 corresponds to the fill level of the medium 101 outside of the sounding tube 102. The sounding tube 102 is provided, on the one hand, to quiet movements of the medium 101 in the tank 100. The sounding tube 102 serves, thus, as a "wave breaker". Moreover, the sounding tube 102 can be applied for determining the fill level of the medium 101. Earlier applied for this were mechanical methods, while today a fill level measurement is performed within the sounding tube 102 by means of radar. For this, there is placed on the upper end of the sounding tube 102 a radar measuring device 104. Radar measuring device 104 includes a radar transmission unit, which produces a radar transmission signal and in-couples such via the waveguide transition 105 into the sounding tube 102. The transmitted radar signal is reflected within the sounding tube 102 on the surface of the medium 101 and returns to the radar measuring device 104. Radar measuring device 104 includes a radar receiving unit, which receives and evaluates the radar signal reflected back. Based on the radar received signal, then the fill level of the medium 101 can be determined.

Use of the sounding tube 102 offers a series of advantages for fill level measurement in the tank 100. Thus, the wall of the sounding tube 102 assures that even in the case of strongly agitated surface of the medium 101 within the tank 100, the surface within the sounding tube 102 remains comparatively quiet. Also, when foam formation happens within the tank, the foam scarcely influences the measuring in the sounding tube 102. In case a fill level measurement should be performed within a comparatively small containment, often there is not sufficient space available within the containment for a radar measuring device. For a sounding tube with comparatively small diameter, there is, in contrast, sufficient space present. The radar measuring device can then be placed outside of the containment. A further advantage is that the radar waves are concentrated by the sounding tube 102 on a comparatively small area. In this way, one obtains a stronger reflection signal. This is especially advantageous when the medium 101 is a liquid with a small dielectric constant, which has comparatively poor reflection characteristics. In the case of application of a sounding tube, one obtains even for such liquids a reflected signal of sufficient intensity. The application of a sounding tube also offers advantages when the medium is a poisonous or dangerous chemical. The sounding tube 102 enables installation of an additional ball valve, which seals the tank 100, when the radar measuring device 104 must be removed.

In this case, the tank 100 does not have to be emptied, before the radar measuring device 104 is disconnected.

Preferably, radar measurement according to the FMCW (Frequency Modulated Continuous Wave) principle is performed for determining the fill level.

Figure 1B:
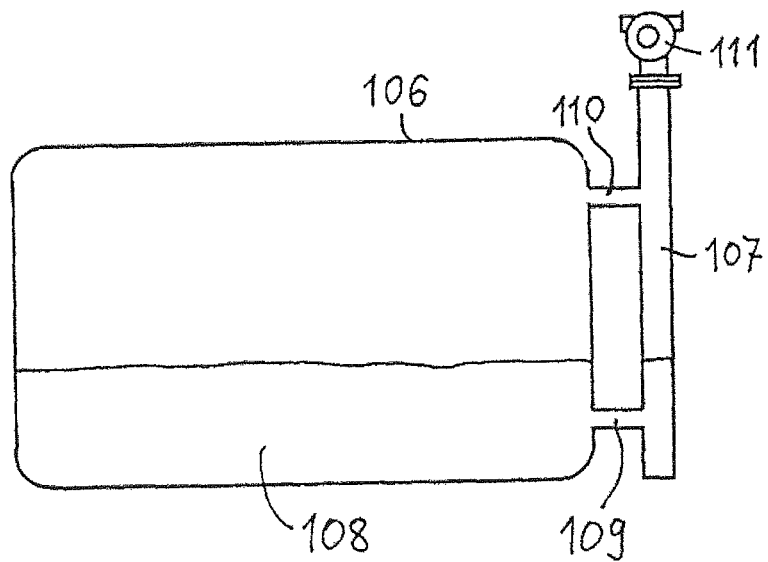
FIG. 1B a tank with a bypass tube arranged outside of the tank and a radar measuring device for performing a fill level measurement in the bypass tube.

FIG. 1B shows a further example of an embodiment, in the case of which the fill level in a tank 106 is determined by means of a bypass tube 107 mounted outside of the tank 106. Tank 106 is filled partially with a medium 108, for example, with a liquid or with a flowable bulk good. The bypass tube 107 is formed by arranging outside of the tank 106 a vertical pipe, which is connected with the tank 106 via a lower connecting tube 109 and via an upper connecting tube 110. As a result, the bypass tube 107 is partially filled with the medium 108, wherein the fill level of the medium 108 within the bypass tube 107 corresponds to the fill level of the medium 108 in the tank 106. A fill level measurement is performed within the bypass tube 107 by means of radar. For this, a radar measuring device 111 is placed on the upper end of the bypass tube 107. The radar measuring device 111 includes a radar transmission unit, which produces a radar transmission signal and in-couples such into the bypass tube 107. The radar transmission signal travels within the bypass tube 107 to the surface of the medium 108 and is reflected on the surface of the medium 108 back to the radar measuring device 111. The radar measuring device 111 includes a radar receiving unit, which receives and evaluates the radar signal reflected on the surface of the medium 108. Based on the radar received signal, then the fill level of the medium 108 in the bypass tube 107 can be determined and, thus, also the fill level of the medium 108 in the tank 106.

Preferably, a radar measurement according to the FMCW (Frequency Modulated Continuous Wave) principle is performed for determining the fill level.

Distance Measurement by Means of Radar According to the FMCW Principle

In the case of distance measurement by means of radar according to the FMCW (Frequency-Modulated Continuous Wave) principle, a frequency modulated radar signal is transmitted in continuous wave operation and reflected on the respective target. The reflected signal is received and evaluated by the distance sensor.

Figure 2A:
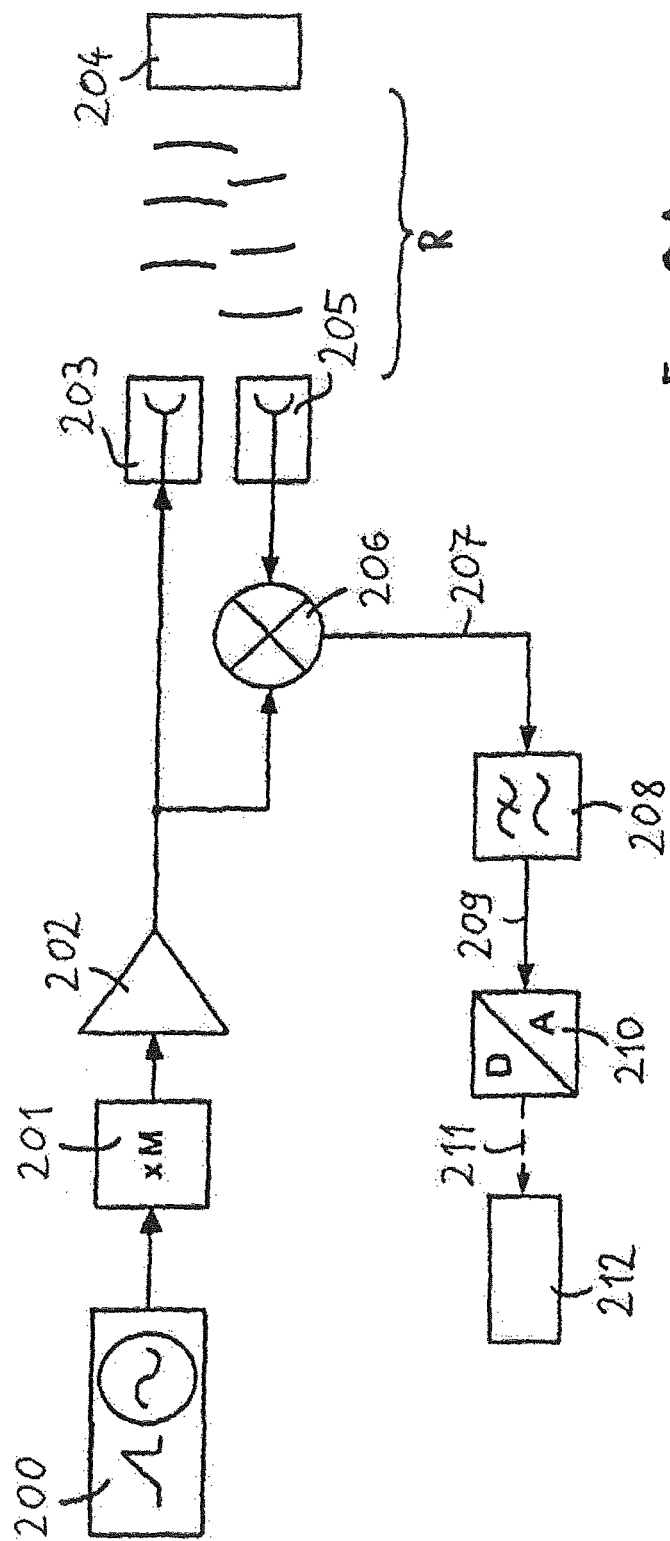
FIG. 2A a block diagram of a distance sensor working according to the FMCW principle.

FIG. 2A shows a block diagram of a distance sensor working according to the FMCW principle. The transmitting branch of the distance sensor includes a signal generator 200, which produces a frequency modulated signal. The signal produced by the signal generator 200 goes via a frequency multiplying stage 201, in which the frequency of the signal is multiplied by a predetermined factor, to an amplifier 202. There, the signal is amplified and then fed to a transmitting port 203. The frequency modulated, radar transmission signal is emitted via the transmitting port 203.

FIG. 2B shows frequency of the transmission signal 213 produced as a function of time. It is to be noted that the frequency of the transmission signal 213 alternately linearly rises and then falls. During a first modulation period length $T_0$, the frequency of the transmission signal increases linearly from the frequency $f_0$ to the frequency $f_0+\Delta f_0$, wherein the variable $\Delta f_0$ is referred to as the frequency sweep. During a thereon following, second modulation period length $T_0$, the frequency could fall from $f_0+\Delta f_0$ linearly back to $f_0$, in which case a triangular waveform would result. Alternatively to the triangular curve, the frequency of the transmission signal can also have a sawtooth-shaped frequency curve, as shown in FIG. 2B.

The frequency $f_s(t)$ of the sent, transmission signal 213 rises as a function of time with the slope S:

$$f_s(t)=f_0+S \cdot t \tag{1}$$

The slope S is fixed by the frequency sweep $\Delta f_0$ and the modulation period length $T_0$:

$$S = \frac{\Delta f_0}{T_0} \tag{2}$$

The frequencies of the radar transmission signals lie in the range of, for instance, 4 GHz to 100 GHz. The frequency sweep $\Delta f_0$ could be, for example, a number of GHz. The modulation period length could be selected, for example, from the range lying between, for instance, 0.1 msec and 5 msec. These data serve only for illustrating typical orders of magnitude. Solutions lying outside these ranges are possible.

As shown in FIG. 2A, a part of the radiated transmission signal is reflected back to the distance sensor by a target 204 located a distance R from the distance sensor. The radar signal requires a travel time τ for the path from the transmitting port 203 to the target 204 and back to the receiving port 205.

The reflected signal is received by the receiving port 205 of the distance sensor and fed to a receiving mixer 206. In the receiving mixer 206, the received signal is mixed with the instantaneously transmitted, transmission signal. The so produced mixer signal 207 is filtered by a sampling lowpass filter 208, which suppresses frequency components above a limit frequency. Sampling lowpass filter 208 limits the bandwidth of the mixer signal 207 before the digitizing. Moreover, the limit frequency establishes a maximum distance $R_{max}$. The lowpass filtered, intermediate frequency signal 209 is sampled and digitized by an analog-digital converter 210. The so obtained, digitized, intermediate frequency signal 211 contains target frequency components for one or more targets, of which, in each case, an associated target distance can be determined. The digitized intermediate frequency signal 211 is fed to the digital signal processing unit 212 for evaluation, in order to determine the frequency components contained in the intermediate frequency signal.

Preferably, the digital signal processing unit 212 performs a Fourier transformation (Fast Fourier Transform, FFT) of the sample values, wherein the distances can then be directly determined from the locations of the peaks of the Fourier spectrum.

Distance sensors of the type shown in FIG. 2A can be applied, for example, as fill level measuring devices in process measurements technology, in order to determine the distance to a surface of a liquid or a bulk good in a container.

Signal Propagation in the Free Field Case

When the transmission signal 213 is freely radiated (the so called "free field case"), then the signal propagates with the speed of light c. A part of the radiated transmission signal is reflected by the target 204 back to the distance sensor.

For the free field case, the travel time τ, which the signal requires for the distance from the transmitting unit to the target 204 and back to the receiving unit, can be expressed as follows:

$$\tau = \frac{2 \cdot R}{c} \quad (3)$$

In such case, R is the distance to the target and c the speed of light in air. The speed of light in air c depends on the speed of light $c_0$ in vacuum via the relationship $$c = \frac{c_0}{\sqrt{\varepsilon_r}},$$

wherein $\varepsilon_r$ is the dielectric constant of air.

During the travel time τ required by the radar signal, the transmission signal 213 produced by the signal generator continues to rise, so that the frequency of the instantaneously radiated transmission signal is greater than the frequency of the received signal. The received signal 214 for the free field case delayed by the travel time τ is drawn dashed in FIG. 2B.

As a result of the travel time τ of the radar signal, a frequency difference occurs between transmission signal and received signal characteristic for the travel time τ, and this frequency difference is referred to as the target frequency $f_{target}$. For the free field case, the target frequency $f_{target}$ can be derived from the slope S of the transmission signal and the travel time τ. For the free field case, the target frequency $f_{target}$ is then $$f_{target} = S \cdot T = S \cdot \frac{2 \cdot R}{c} \quad (4)$$

Since the variables S and c are constant, there results in the free field case a direct proportionality between the target frequency $f_{target}$ and the associated distance R to the target. Consequently, the distance R to the target can be derived directly from the target frequency $f_{target}$.

Signal Propagation in a Pipe or Tube

Propagation of the radar signal in a pipe or tube differs markedly from the propagation of the radar signal in the free field, because the wall of the tube constrains and guides the wave propagation. The pipe or tube acts as a round, hollow conductor for the radar signal.

Considering the conditions of the round hollow conductor, the differential equation for wave propagation in round hollow conductors can be established from the Maxwell equations. The solution of this differential equation is the Bessel functions, which describe the propagation of the radar signal in the round hollow conductor.

In such case, different modes result for signal propagation in a round hollow conductor. Referred to as modes are certain electrical and magnetic field configurations, which can propagate in the hollow conductor. Fundamentally, there are two different types of modes in the hollow conductor: the $TE_{m,n}$ modes (transverse electric) and the $TM_{m,n}$ modes (transverse magnetic). In the case of the $TE_{m,n}$ modes, the electrical field vector is oriented perpendicular to the propagation direction of the wave. In the case of the $TM_{m,n}$ modes, the magnetic field vector is oriented perpendicular to the propagation direction of the wave.

Characteristic for propagation of electromagnetic waves in hollow conductors is that the electromagnetic waves can only propagate in the hollow conductor when their frequency lies above a defined cutoff frequency $f_c$. For electromagnetic waves with a frequency below this characteristic cutoff frequency $f_c$, no wave propagation in the hollow conductor is possible. The cutoff frequency $f_c$ is different for each mode and can be calculated for each case.

For a TE mode $TE_{m,n}$, the associated cutoff frequency $f_{c,mn}$ is:

$$f_{c,mn} = \frac{c \cdot \chi'_{mn}}{\pi \cdot D} \quad (5)$$

In this equation, $\chi'_{mn}$ is the n-th zero location of the derivative of the m-th Bessel function $J_m(x)$, c is the speed of light in air, and D the diameter of the round hollow conductor (thus of the pipe or tube).

For a TM mode $TM_{m,n}$, the associated cutoff frequency $f_{c,mn}$ is:

$$f_{c,mn} = \frac{C \cdot \chi_{mn}}{\pi \cdot D} \quad (6)$$

In this equation, $\chi_{mn}$ is the n-th zero location of the m-th Bessel-function $J_m(x)$, c is the speed of light in air, and D the diameter of the round hollow conductor (thus of the pipe or tube).

In the free field case, radar waves propagate with the speed of light c in air. In the free field case, the propagation velocity, consequently, does not depend on the frequency of the radar signal.

In the hollow conductor, the individual modes propagate with a respective group velocity $v_g$, which depends on the speed of light c in air and the factor $\beta_{rel,mn}$:

$$v_g = c \cdot \beta_{rel,mn} \quad (7)$$

The factor $\beta_{rel,mn}$ is as follows:

$$\beta_{rel,mn} = \sqrt{1 - \left(\frac{f_{c,mn}}{f}\right)^2} \quad (8)$$

In such case, $f_{c,mn}$ is the cutoff frequency of the respective mode and f the frequency of the radar signal. The factor $\beta_{rel,mn}$ has values in the range between 0 and 1.

The group velocity $v_g$ of a mode in the hollow conductor can thus be expressed as follows:

$$v_g = c \cdot \sqrt{1 - \left(\frac{f_{c,mn}}{f}\right)^2} \quad (9)$$

The antenna structure for in-coupling the radar signal into the pipe is preferably so designed that the energy is applied essentially only for exciting a single mode.

Since each mode has a different propagation behavior, one would like to prevent the forming of many different modes in radar measurement in pipes or tubes. False or blurred echos, which result from the different travel times of the different modes superimposed on one another, would otherwise occur. Especially advantageous is the exciting of the mode $TE_{01}$, because the field configuration of this mode is especially well suited for propagation in a pipe or tube.

The case will now be discussed, in which essentially only a single mode is excited to any significant extent. Later, the case will be discussed, in which the excitation energy is divided among a number of different modes, each of which propagates with a different propagation behavior. Such case is later more exactly discussed when multimodal dispersion is taken up.

Figure 3:
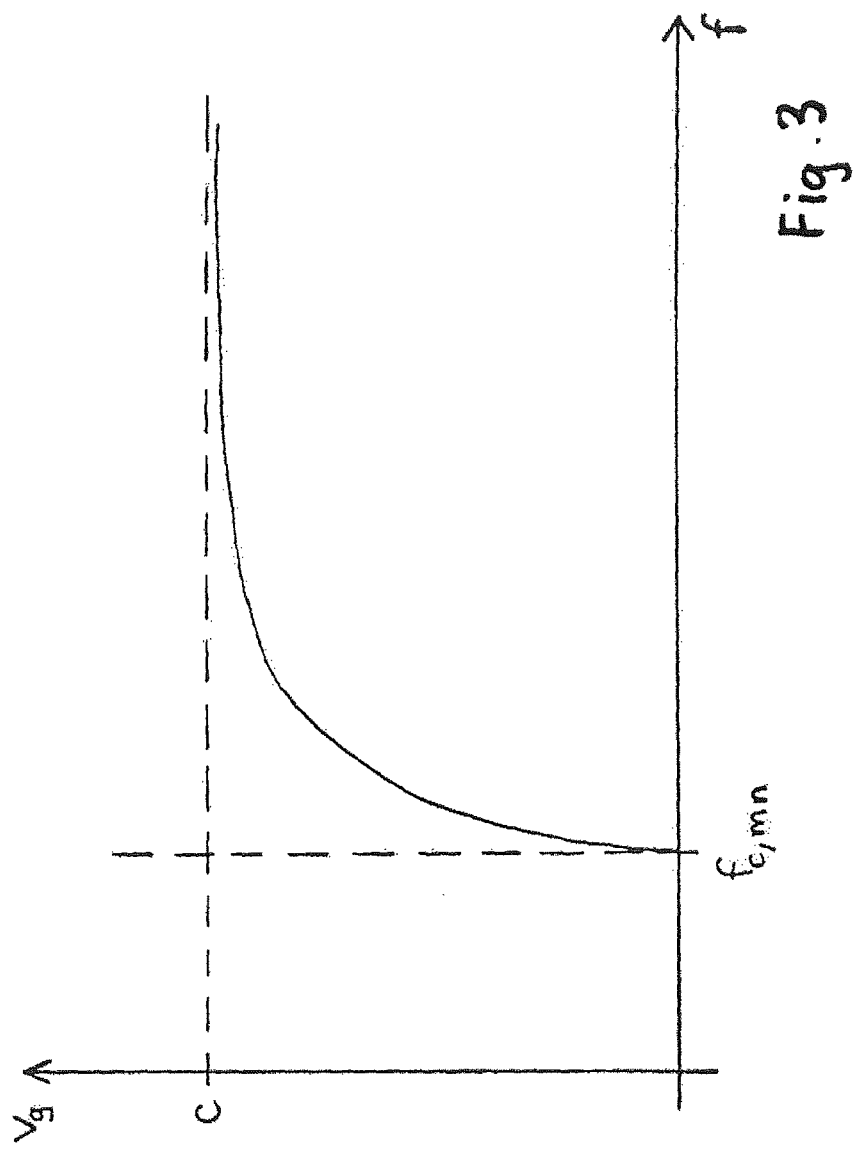
FIG. 3 propagation velocity as a function of frequency for a certain mode in a pipe or tube.

For illustrating the propagation behavior of radar signals in a hollow conductor, the group velocity $v_g$ in a hollow conductor is plotted in FIG. 3 as a function of frequency.

Shown on the horizontal axis of FIG. 3 is the cutoff frequency $f_{c,mn}$ for a certain mode. For frequencies below this cutoff frequency, no wave propagation is possible in the hollow conductor. Wave propagation in the hollow conductor begins at the cutoff frequency $f_{c,mn}$. With rising frequency, the group velocity $v_g$ increases in the hollow conductor and increasingly nears the speed of light c in air.

FIG. 3 shows that the group velocity $v_g$ in the hollow conductor, thus the propagation velocity of the radar signal in the hollow conductor, has a strong dependence on the frequency of the radar signal. Radar signal components of different frequency propagate in the hollow conductor with different velocity.

In the case of fill level measurement in a pipe or tube, a frequency modulated radar signal is coupled into the pipe or tube according to the principles of FMCW radar. Since the frequency of the coupled FMCW radar signal varies corresponding to the ramp shown in FIG. 2B, the propagation velocity of the radar signal varies also. The different propagation velocities cause a smearing and diverging of the reflected radar signal, which must be evaluated by the radar measuring device. This frequency dependence of the propagation velocity is referred to as dispersion. The effects caused by this frequency dependent propagation velocity, especially the smearing and diverging of the reflected signal, are referred to as dispersive effects. In the following, a correction for these dispersive effects will now be derived.

Phase Effects in the Intermediate Signal Brought about by Dispersion

The transmission, sent signal of FMCW radar in the form a frequency ramp can be described as in Equation (1) by its instantaneous frequency $f_s(t)$:

$$f_s(t) = f_0 + S \cdot t \quad (1)$$

In such case, $f_0$ is the starting frequency and S the slope of the frequency ramp. The frequency rises beginning at the starting frequency $f_0$ linearly with the slope S.

The slope S is established corresponding to Equation (2) by the frequency sweep $\Delta f_0$ and the modulation period length $T_0$:

$$S = \frac{\Delta f_0}{T_0} \quad (2)$$

In general, the transmission signal can be defined by its instantaneous phase $\varphi_s(t)$:

$$s(t) = \cos(\varphi_s(t)) \quad (10)$$

The instantaneous phase $\varphi_s(t)$ can be calculated by integrating the instantaneous frequency $f_s(t)$:

$$\varphi_s(t) = 2\pi \int_0^t f_s(\bar{t}) d\bar{t} = 2\pi f_0 t + \pi S t^2 \varphi_{s,0} \quad (11)$$

The transmission signal travels within the pipe or tube to a radar target. The radar target can be e.g. the surface of a liquid or a bulk good. The transmission signal is reflected on this radar target at the distance R and then travels back to the radar measuring device. In this way, a frequency dependent delay time $\tau(f)$ results, which due to the linearly increasing ramp behavior can also be written in simple manner as a function of time t:

$$\tau(t) = \frac{2 \cdot R}{c \cdot \beta_{rel}(f)} \quad (12)$$

$$= \frac{2 \cdot R}{c \cdot \sqrt{1 - \left(\frac{f_{c,mn}}{f_s(t)}\right)^2}}$$

$$= \frac{2 \cdot R}{c \cdot \sqrt{1 - \left(\frac{f_{c,mn}}{f_0 + S \cdot t}\right)^2}}$$

The received signal is:

$$e(t) = \cos(\varphi_e(t)) \quad (13)$$

$$\varphi_e(t) = 2\pi \int_0^t f_s(\bar{t} - \tau(\bar{t})) d\bar{t} \quad (14)$$

$$= 2\pi \int_0^t f_0 + S \cdot (\bar{t} - \tau(\bar{t})) d\bar{t}$$

$$= 2\pi \int_0^t f_0 + S \cdot \bar{t} - S\tau(\bar{t}) d\bar{t}$$

$$= 2\pi f_0 t + \pi S t^2 - 2\pi S \cdot \int_0^t \tau(\bar{t}) d\bar{t} + \varphi_{e,0}$$

For producing the intermediate signal, the transmission signal is mixed with the received signal in the receiving mixer 206 shown in FIG. 2A, in order, in this way, to produce the intermediate frequency signal. The filtered intermediate frequency signal reflects (assuming an ideal mixer) the phase difference between the phase $\varphi_s(t)$ of the transmission signal and the phase $\varphi_e(t)$ of the received signal. The mixture of transmission signal and received signal leads thus to an intermediate frequency signal representable in the following way:

$$z(t) = \cos(\varphi_z(t)) \tag{15}$$

$$\begin{aligned}\varphi_z(t) &= \varphi_s(t) - \varphi_e(t) \tag{16}\\ &= 2\pi S \cdot \int_0^t \tau(\bar{t}) d\bar{t} + \Delta\varphi \\ &= 2\pi \frac{2SR}{c} \cdot \int_0^t \frac{1}{\beta_{rel}(f_0 + S \cdot \bar{t})} d\bar{t} + \Delta\varphi \\ &= 2\pi \frac{2R}{c} \frac{(f_0 + f_c + St)(f_0 - f_c + St)}{(f_0 + St)\sqrt{\frac{f_0^2 + 2f_0 St + S^2 t^2 - f_c^2}{(f_0 + St)^2}}} \bigg|_{\bar{t}=0}^{t} + \Delta\varphi \\ &= 2\pi \frac{2R}{c} \cdot \sqrt{(f_0 + ST)^2 - f_c^2} \bigg|_{\bar{t}=0}^{t} + \Delta\varphi \\ &= 2\pi \frac{2R}{c} \cdot \left(\sqrt{(f_0 + St)^2 - f_c^2} - \sqrt{f_0^2 - f_c^2}\right) + \Delta\varphi\end{aligned}$$

This equation brings together the dispersive effects on the phase of the intermediate signal, as caused by the frequency dependence of the group velocity. In such case, all time independent phase contributions are combined in the start phase $\Delta\varphi$.

Determining the Start Phase $\Delta\varphi$

All time independent phase contributions to the phase $\varphi_z(t)$ of the intermediate signal are combined in the start phase $\Delta\varphi$. The start phase $\Delta\varphi$ is determined as follows. The start phase $\Delta\varphi$ can be estimated from the difference of the phase $\varphi_s(t)$ of the transmission signal and the phase $\varphi_e(t)$ of the received signal at the point in time $t=0$.

The phase $\varphi_s(t)$ of the transmission signal can be written corresponding to Equation (11) as:

$$\varphi_s(t) = 2\pi f_0 \int_0^t f_s(\bar{t}) d\bar{t} = 2\pi f_0 t + \pi S t^2 + \varphi_{s,0} \tag{11}$$

As regards the phase $\varphi_e(t)$ of the received signal, an estimation is performed for determining the start phase $\Delta\varphi$. For determining the start phase $\Delta\varphi$, it is assumed that the travel time $\tau$ is constant and does not depend on the frequency. For determining the start phase $\Delta\varphi$, thus as in the free field case, the dispersion is neglected. This approach is, strictly taken, wrong for a pipe or tube, for in a pipe or tube, the propagation velocity and therewith also the travel time $\tau$ depend on the frequency of the radar signal. Nevertheless the following expression, in the case of which a constant, frequency independent, travel time $\tau$ is set, can be used for estimating the start phase $\Delta\varphi$ of the intermediate frequency:

$$\begin{aligned}\varphi_e(t) &= \varphi_s(t - \tau) \tag{17}\\ &= 2\pi f_0 (t - \tau) + \pi S(t - \tau)^2 + \varphi_{s,0} \\ &= 2\pi f_0 t - 2\pi f_0 \tau + \pi S t^2 + \pi S \tau^2 - 2\pi S t \tau + \varphi_{s,0}\end{aligned}$$

For the start phase $\Delta\varphi$, there results then:

$$\begin{aligned}\Delta\varphi &= \varphi_s(0) - \varphi_e(0) = \tag{18}\\ &= 2\pi f_0 \tau(0) + \pi S \tau^2(0)\end{aligned}$$

Correspondingly, Equation (12) becomes for $\tau(0)$:

$$\tau(0) = \frac{2 \cdot R}{c \cdot \beta_{rel}(f_0)} \tag{19}$$

Therewith, the start phase $\varphi_z(0)$ becomes:

$$\varphi_z(0) = \Delta\varphi = 2\pi f_0 \frac{2R}{c \cdot \beta_{rel}(f_0)} + \pi S \left(\frac{2R}{c \cdot \beta_{rel}(f_0)}\right)^2 \mod 2\pi \tag{20}$$

Deriving a Dispersion Correction

The intermediate frequency signal $z(t)$ is interpretable after a Fourier transformation as the distance response of the radar system. The non-linear phase results in the case of the Fourier transformation in a smearing of the target response in the spectral range.

Options for evaluation of the intermediate signal with dispersion influence as well as attention to other sources of error will now be presented.

In the forms of embodiment of the invention, it is provided that a correction of the dispersion influence on the phase is made before additional evaluation. Then, for example, a discrete Fourier transformation, respectively a FFT, can be taken into consideration for the evaluation, while no longer having to cope with a considerable broadening and smearing of the peak in the spectral range.

To this end, an additive phase correction will now be derived, which is applied to the phase of the intermediate signal before performing the discrete Fourier transformation, respectively FFT. This phase correction has, on the one hand, the goal of lessening, respectively eliminating, the part of the phase according to Equation (16) caused by dispersion. Moreover, a phase is added rising linearly with time, such as would occur in the case of a system with constant, frequency independent, group velocity $v_{const}$. In such case, the diameter D of the hollow conductor, respectively the cutoff frequency $f_c$ resulting therefrom, enters into the relationship. The cutoff frequency derived from the measured diameter D and burdened with measurement uncertainty is represented in the following as $\hat{f}_c$. Insofar, the following phase correction results:

$$\varphi_{z,corr}(t) = 2\pi \frac{2R}{c} \cdot \left(\sqrt{(f_0 + St)^2 - \hat{f}_c^2} - \sqrt{f_0^2 - \hat{f}_c^2}\right) - 2\pi \frac{2RS}{v_{const}} \cdot t \tag{21}$$

The first term $$2\pi \frac{2R}{c} \cdot \left(\sqrt{(f_0 + St)^2 - \hat{f}_c^2} - \sqrt{f_0^2 - \hat{f}_c^2}\right) \tag{22}$$

serves for lessening, respectively eliminating, the phase behavior caused by dispersion.

The second term $$-2\pi \frac{2RS}{v_{const}} \cdot t \tag{23}$$

serves for adding a phase increasing linearly with time, such as would result in the case of a constant, frequency independent, group velocity $v_{const}$. The constant, frequency independent, propagation velocity $v_{const}$ can be fixed freely within certain limits. For example, $v_{const}$ can be fixed as the group velocity at the frequency $f_0$: $v_{const}=c\cdot\beta_{rel}(f_0)$ or $v_{const}$ can be fixed as the speed of light c in air: $v_{const}=c$ Dependence of the Dispersion Correction on Distance R to the Target Equation (21) shows that both the first term as well as also the second term of the phase correction $\varphi_{z,corr}(t)$ depend on the distance R to the target, which at the point in time of determining the phase correction is still not known. The distance R to the target must still be determined.

In order to be able to perform the phase correction $\varphi_{z,corr}(t)$ described by Equation (21) in spite of this, there are different options:

A first option is to estimate the distance R to the target by evaluating the non-dispersion corrected, intermediate signal delivered by the receiving mixer 206. The so obtained distance R to the target$_{estimated}$ is, indeed, not exact, but it can, nevertheless, be taken into consideration for a first determination of the phase correction $\varphi_{z,corr}(t)$.

A second option for estimating the distance to the target is possible, when the fill level of a containment is determined cyclically in regular time intervals. In this case, one can proceed on the assumption that the fill level is changing slowly and continuously. Therefore, two sequentially ascertained fill level measured values lie relatively near to one another. Insofar, an earlier fill level measured value can serve as an estimation for the current fill level measured value. Based on this assumption, an earlier fill level measured value can be used as estimated value $R_{estimated}$ for the distance to the target.

Iterative, Mutually Dependent Determination of the Distance R to the Target and the Phase Correction $\varphi_{z,corr}(t)$ A yet higher accuracy can be achieved by using an iterative method. In such case, again, an estimated value of the distance to the target serves as starting point for determining the phase correction $\varphi_{z,corr}(t)$. The phase correction $\varphi_{z,corr}(t)$ is taken into consideration for correction of the intermediate signal, and starting from the phase corrected intermediate frequency signal, for example, by means of FFT, an improved, more accurate value of the distance R to the target can be ascertained. With help of this more exact value of R, the phase correction is determined anew and taken into consideration for correction of the intermediate signal. The so obtained phase corrected intermediate frequency signal can then, in turn, serve for determining the target distance R with yet better accuracy, etc. Insofar, the distance R to the target and the phase correction $\varphi_{z,corr}(t)$ can be determined mutually alternatingly, iteratively. In the course of a number of iterations, the distance R to the target converges to its actual value and also the phase correction $\varphi_{z,corr}(t)$ becomes always more exact, so that dispersive effects are always better eliminated. By this iterative procedure, one obtains, even after just a few iterations, very exact values for the distance R to the target and the phase correction $\varphi_{z,corr}(t)$.

Evaluation of the Phase Corrected Intermediate Signal

If one subtracts the phase correction term $\varphi_{z,corr}(t)$ from the measured phase, then there remains ideally (in the case of faultlessly known tube or pipe diameter), linearly rising with time, a phase, which is brought about by the second term of Equation (21). This linear phase can be evaluated simply with the Fourier transformation:

$$\varphi_c(t) = \varphi_z(t) - \varphi_{z,corr}(t) \quad (24)$$

$$= 2\pi \frac{2RS}{v_{const}} \cdot t$$

In this way, one obtains the target frequency component $f_{target}$:

$$f_{target} = \frac{\omega}{2\pi} = \frac{1}{2\pi}\frac{d}{dt}\varphi_c(t) = \frac{2RS}{v_{const}} \quad (25)$$

The distance R to the target can then be derived from the so ascertained target frequency component:

$$R = \frac{f_{target} \cdot v_{const}}{2S} \quad (26)$$

For evaluation, again exactly that propagation velocity $v_{const}$ is used, which was already used in Equation (21) for producing the linearly increasing, second phase term. When thus $v_{const}=c\cdot\beta_{rel}(f_0)$ has been set, then again $v_{const}=c\cdot\beta_{rel}(f_0)$ is also used for evaluation. When the speed of light c was used as $v_{const}$, $v_{const}=c$, then $v_{const}=c$ is also used again for evaluation.

No Change of the Start Phase $\varphi_z(0)$ by the Phase Correction

Based on Equation (21), one can see that for t=0 the start phase $\varphi_z(0)$ is not changed by the phase correction. This start phase can thus likewise be read off from the result of the complex Fourier transformation at the position of the magnitude maximum in the spectral range (modulo $2\pi$). For the phase $\varphi_z(0)$ it holds, consequently, further, corresponding to Equation (20):

$$\varphi_z(0) = 2\pi f_0 \frac{2R}{c\cdot\beta_{rel}(f_0)} + \pi S\left(\frac{2R}{c\cdot\beta_{rel}(f_0)}\right)^2 \mod 2\pi \quad (20)$$

Application of the dispersion correction does not degrade the phase information of the intermediate signal. Also, after application of the dispersion correction to the phase, the phase information can still be utilized in the context of additional signal evaluation. Insofar, after performing the phase correction, both the magnitude as well as also the phase of the intermediate signal can be used for further evaluation. In such case, it is to be noted that the phase reacts clearly less sensitively to small disturbances, while a pure evaluation of the magnitude spectrum already shows mentionable deviations in the exact position determination of the maximum.

Figure 4:
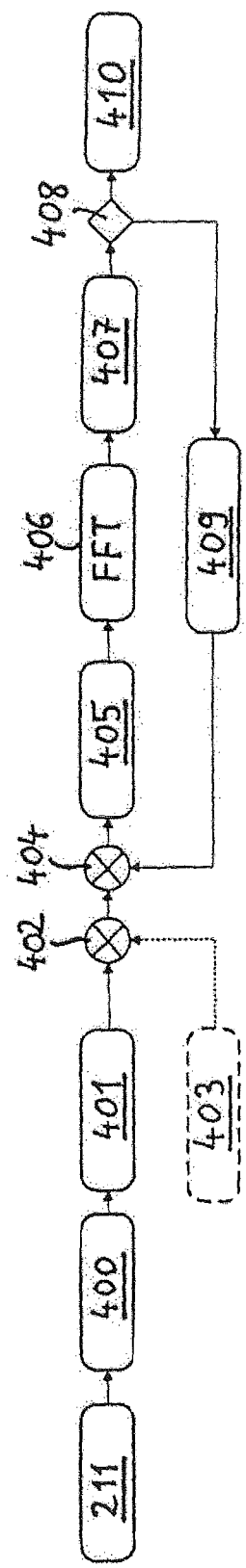
FIG. 4 a first method for iterative dispersion correction for a fill level measurement in a pipe or tube.

Detailed Course of the Method for Ascertaining Distance to the Target and Dispersion Correction The flow diagram of FIG. 4 shows in detail how the dispersion correction as well as the distance to the target can be determined by means of an iterative method. Serving as starting point is the digitized intermediate frequency signal 211 shown in FIG. 2A. The digitized intermediate frequency signal 211 is a real-valued time signal.

First, in step 400, which is also referred to as the "DC remove" step, the DC portion of the intermediate signal is removed. There results a real time signal, which has different frequency components, however, no longer a DC portion. This signal is subjected in the next step 401 to a Hilbert transformation. With the help of the Hilbert transformation, real and imaginary parts of a complex valued signal can be mapped to one another. In the following case, the Hilbert transformation in step 401 is used to produce for the real intermediate frequency signal an associated imaginary part, in order, in this way, to be able to provide a complete, complex, time signal. The following operations are then performed on this complex valued, time signal.

In a following, optional step, a device-specific correction curve is applied to the signal in the mixing stage 402. By application of the device-specific correction curve to the signal, the specific transmission characteristics of the respective radar measuring device can be taken into consideration. The device-specific correction curve is produced in step 403 and registers the transfer behavior of the radar measuring device, which includes the HF-module, the mode changer with HF antenna, as well as various connection cables, line portions and plug connectors.

In the following, two different options are presented for illustrating how these devices-specific properties of the radar measuring device can be registered and taken into consideration.

First Option for Device Correction: Performing a Reference Measurement

For registering the transmission characteristics of the radar measuring device, a reference measurement $z_{ref}(t)$ is performed with a known target. After filtering out all undesired targets, the reference measurement $z_{ref}(t)$ is upgraded with the assistance of the Hilbert transformation to a complex valued, analytical signal. Therefrom, then both the phase $\angle H\{z_{ref}(t)\}$ of the reference target response as well as the amplitude curve $|H\{z_{ref}(t)\}|$ of the reference target response can be derived. Especially, the phase $\angle H\{z_{ref}(t)\}$ can be taken into consideration for device-specific correction of the complex valued intermediate signal:

$$z_{corrected}(t) = \frac{H\{z_{measured}(t)\}}{e^{-j\angle H\{z_{ref}(t)\}}} \tag{27}$$

In this way, the specific, special features of the respective measuring system can be taken into consideration with the assistance of the reference measurement $z_{ref}(t)$. In such case, it proves to be advantageous to perform exclusively a correction of the phase, not, however, the amplitude. If one would perform a correction of the amplitude, then problems could arise due to zero points in the transfer function; moreover, noise in regions of small transmission would be increased. However, the amplitude curve $|H\{z_{ref}(t)\}|$ ascertained from the reference measurement can serve as a weighting factor in the evaluation. In such case, a lesser transmission factor magnitude, which corresponds to a smaller signal to noise ratio (SNR), would result in a smaller weighting of the measured value.

Alternatively to performing a reference measurement, a second, somewhat simpler option for performing a device-specific correction will now be discussed.

Second Option for Device Correction: Dividing the Measuring Path into a Non-Dispersive Path Portion and a Dispersive Path Portion In the case of a real radar measuring system, the radar waves travel a part of the total distance R while still within the sensor, which includes an HF module, a mode changer, an antenna, as well as various connection cables, line portions and plug connectors. In this subsection, the waveguide dispersion effects can be neglected, since they are much weaker than in the pipe or tube. This subsection characterized by a non-dispersive propagation behavior is referenced with $R_{non}$. The remaining part of the total distance R is traveled in the pipe or tube, in which case the propagation is burdened with dispersion. This subsection of the transmission path is referenced with $R_{disp}$. Thus:

$$R = R_{non} + R_{disp} \tag{28}$$

The delay time $\tau(t)$ in the case of passing through the complete transmission path is $$\tau(t) = \frac{2R_{non}}{c} + \frac{2R_{disp}}{c \cdot \beta_{rel}(f)} \tag{29}$$

Therewith, there results for the dispersion correction:

$$\varphi_{z,corr}(t) = \tag{30}$$

$$2\pi \frac{2R_{disp}}{c} \cdot \left( \sqrt{(f_0 + St)^2 - \hat{f}_c^2} - \sqrt{f_0^2 - \hat{f}_c^2} \right) - 2\pi \frac{2R_{disp} \cdot S}{v_{const}} \cdot t$$

This equation corresponds exactly to Equation (21), wherein instead of R the dispersion burdened path portion $R_{disp} = R - R_{non}$ is used.

By this dividing of the total measuring path into a non-dispersive path portion and a path portion characterized by dispersion, the device-specific, special features can be taken into consideration in simple manner.

After the performing the device-specific correction in the mixing stage 402, a dispersion correction is applied to the intermediate frequency signal in the mixing stage 404 following thereon. Then in the following three steps 405, 406, 407, the distance R to the target is ascertained. In step 405, a "windowing" of the conditioned, time discrete, intermediate signal is performed. This means that the values of the complex valued signal are weighted with a window function, in order to prevent undesired effects, which are brought about by the constraint of the observation window. In step 406, a fast Fourier transformation (Fast Fourier Transform, FFT) is performed. As result of the Fourier transformation, one obtains a complex frequency spectrum, which has a frequency peak for each target frequency component contained in the intermediate frequency signal. In step 407 following thereon, the peaks in the frequency spectrum are detected. From the so obtained target frequency components, then the distance R to the target is derived. In step 408, it is ascertained whether more iterations need to be performed for exact determination of the distance to the target. As soon as the ascertained distance to the target no longer undergoes significant changes, the iterations can be stopped.

In case another iteration is performed, the distance $R_n$ to the target ascertained in the n-th iteration serves as starting point for the new calculation of the dispersion correction in step 409. One obtains corresponding to Equation (21) for the n-th iteration the phase correction $\varphi_{z,corr,n}(t)$, which is used in the mixer stage 404 for phase correction of the intermediate signal. This phase correction can be written as:

$$\varphi_c(t) = \varphi_z(t) - z_{corr,n}(t) \tag{31}$$

In such case, $\varphi_z(t)$ is the phase of the intermediate signal before the correction, $\varphi_{z,corr,n}(t)$ is the phase correction determined in step 409, and $\varphi_c(t)$ is the corrected phase of the intermediate signal.

Alternatively to the above description, in the case of which a phase correction term is added to (respectively, subtracted from) the phase of the intermediate signal, the phase correction can also be expressed in quotient form. In such case, the complex valued, measured, intermediate frequency signal is divided by a complex correction signal, in order, in this way, to obtain a phase corrected, intermediate frequency signal:

$$\hat{z}_{phase\ corrected,n}(t) = \text{Re}\left\{\frac{H\{z_{measured}(t)\}}{H\{z_{corr,R_n}(t)\}}\right\} \quad (32)$$

In this equation, $H\{z_{measured}(t)\}$ is the Hilbert transform of the measured, real, intermediate signal $z_{measured}(t)$. $H\{z_{corr,R_n}(t)\}$ is the Hilbert transform of the correction signal $z_{corr,R_n}(t)$, which was determined in step 409 based on the distance $R_n$ to the target. The correction signal $z_{corr,R_n}(t)$ is designed to eliminate the dispersive effects in the intermediate frequency signal and to replace such by a linear phase.

The phase corrected, intermediate frequency signal $\hat{z}_{phase\ corrected,n}(t)$ is obtained as the real part of the quotient of $H\{z_{measured}(t)\}$ and $H\{z_{corr,R_n}(t)\}$. The mixer stage 404 shown in FIG. 4 is embodied to perform this complex valued, quotient formation and so to produce the phase corrected signal $\hat{z}_{phase\ corrected,n}(t)$.

The iteration shown in FIG. 4 is performed until both the distance R to the target as well as also the phase correction $\varphi_{z,corr}(t)$ are determined sufficiently exactly. Thus, in a first iteration (n=1) a first distance $R_1$ to the target is obtained, which then is taken into consideration in step 409 for determining a first phase correction $\varphi_{z,corr,1}(t)$. By applying this phase correction $\varphi_{z,corr,1}(t)$ to the intermediate frequency signal, a phase corrected, intermediate frequency signal is produced, whose evaluation delivers the somewhat more exact distance $R_2$ to the target. Based on $R_2$, in step 409 the yet more exact phase correction $\varphi_{z,corr,2}(t)$ is determined and applied to the intermediate frequency signal. Based on the so phase corrected intermediate signal, a third, yet more accurate target distance value $R_3$ can be determined, which then, in turn, is applied for determining a phase correction $\varphi_{z,corr,3}(t)$, and so on.

The iterations are continued until in step 408 it is detected that the ascertained distance to the target no longer changes significantly. In this case, both the distance to the target as well as also the phase correction have converged to their ultimate values. This condition for terminating the iterations is shown somewhat more exactly in the following pseudo-code:

R:=starting value
DO
    s:=SimulateDispersion(R);
    c:=real (Hilbert(measurement)/Hilbert(s));
    Rn:=findPositionoftheDistanceMaximum(c);
    delta=absolute(R−Rn);
    R:=Rn;
WHILE delta>epsilon As long as the difference between the currently ascertained distance to the target and the distance to the target ascertained one iteration earlier is greater than a predetermined epsilon, the iteration is continued. As soon as the predetermined epsilon is subceeded, the iteration is stopped. There results in step 410 the distance to the target as well as the dispersion correction with the desired accuracy.

Figure 5:
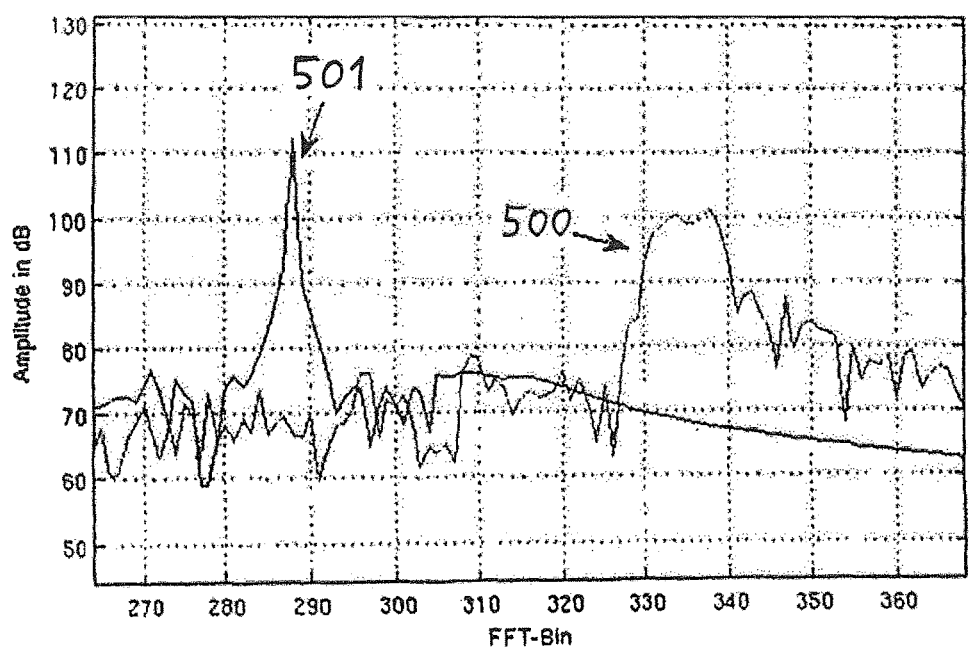
FIG. 5 a comparison of the frequency spectrum before application of the dispersion correction with the frequency spectrum after application of the dispersion correction.

FIG. 5 shows the frequency spectrum of the intermediate signal before and after performing the iterative phase correction. Before performing the phase correction, the frequency peak 500 belonging to the distance R to the target is strongly broadened and washed out as a result of dispersive effects. After performing the phase correction, one obtains the clearly narrower frequency peak 501. It is recognizable that with the assistance of the iterative phase correction the dispersion effects have been greatly reduced. With the sharply defined frequency peak 501, the distance R to the target can be ascertained with high accuracy. The comparison between the widened peak 500 before performing the dispersion correction and the sharp peak 501 after performing the dispersion correction shows that the accuracy of the fill level measurement in a pipe or tube clearly can be improved by applying the iterative phase correction.

Figure 6:
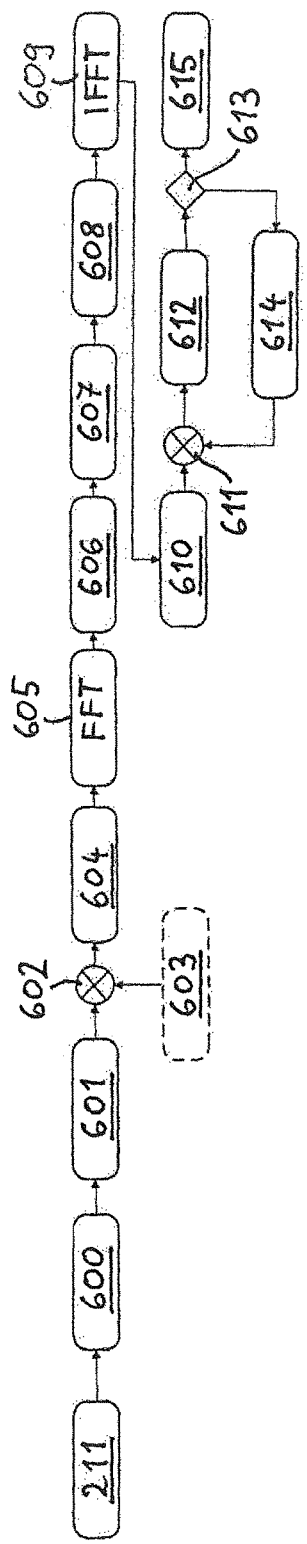
FIG. 6 a second method for iterative dispersion correction for a fill level measurement in a pipe or tube.

Alternative Procedure: Iterative Determining of Dispersion Correction and Distance to the Target by Means of the Phase Slope Method FIG. 6 shows an alternative method for iteratively determining distance to the target and phase correction. Serving as starting point again is the digitized intermediate frequency signal 211 shown in FIG. 2A. The digitized intermediate frequency signal 211 is a real signal in the time domain. In step 600, which also is referred to as the "DC remove" step, first the DC portion of the digitized intermediate signal 211 is removed. The different frequency components contained in the intermediate frequency signal remain. Then, in step 601, a Hilbert transformation is performed, in the case of which the imaginary part associated with the real intermediate frequency signal is calculated. As result of the Hilbert transformation, one obtains a complete, complex, intermediate frequency signal in the time domain. This complex valued signal serves then as basis for the additional operations shown in FIG. 6.

In an optional step following thereon, a device-specific correction curve is applied to the signal in the mixer stage 602. With the help of this device-specific correction curve, specific, special features of the radar measuring device can be taken into consideration, features caused, among other things, by the HF module, the mode changer, the antenna, as well as HF cables, connecting pieces and plug connectors. Different options are available for producing this device-specific correction curve in step 603 and these have already been discussed in connection with the description of FIG. 4. A first option for ascertaining the device-specific correction curve is to perform a reference measurement for a known target and to derive from this reference measurement the device-specific phase response. A second, somewhat simpler option is to divide the entire transmission path, which comprises the length R, into a non-dispersion burdened path section $R_{non}$ and a dispersion burdened path section $R_{disp}$: $R=R_{non}+R_{disp}$. In this way, it is, in simple manner, possible to model the transmission characteristics of the HF module, the mode changer and the antenna at the beginning of the transmission path.

In step 604, the so-called "windowing", the values of the complex valued signal are weighted with a window function. The weighted values serve then as input variables for the fast Fourier transformation (Fast Fourier Transform, FFT) performed in the step 605 following thereon. As result of the fast Fourier transformation, one obtains the frequency spectrum of the intermediate signal. In the step 606 following thereon, the target frequency components contained in this frequency spectrum are detected. In such case, each frequency peak in the frequency spectrum is associated with a radar target. Of special interest for fill level measurement is, in such case, the frequency peak, which was brought about by the reflection of the radar signals on the surface of the liquid, respectively the medium. This frequency peak relevant for the fill level measurement is identified in step 606.

In the step 607 following thereon, then a digital bandpass filter is defined, which is designed to pass from the frequency spectrum the frequency peak caused by the surface of the medium and to suppress other disturbing frequency peaks. For this, the lower limit frequency as well as the upper limit frequency of the bandpass filter are so fixed that the frequency peak brought about by the surface of the medium lies within the passband of the bandpass filter. Disturbing frequency components, which lie below the lower limit frequency or above the upper limit frequency of the bandpass filter, are filtered out. As result of the bandpass filtering performed in step 607, one obtains a frequency spectrum, which then contains essentially only a single frequency peak, namely the frequency peak relevant for the fill level measurement, thus that frequency peak brought about by reflection on the surface of the medium.

This bandpass filtered frequency spectrum is then transformed by means of an inverse Fourier transformation back into the time domain. For this, in step 608, a windowing of the bandpass filtered frequency spectrum is performed. In such case, the values of the bandpass filtered frequency spectrum are weighted with a window function. Then, in step 609, an inverse fast Fourier transformation (Inverse Fast Fourier transform, IFFT) is performed. As a result of the inverse fast Fourier transformation, one obtains a complex time signal, which essentially contains only a single frequency component, namely the frequency component, which has arisen from the reflection of the radar signal on the surface of the medium. In the next step 610, which is also referred to as a "phase unwrapping" step, the phase is reconstructed from the complex valued time curve. Since the complex valued time signal contains essentially only one frequency component, namely the frequency component caused by the reflection on the surface of the medium, essentially a continuous phase increasing linearly with time results. In reconstructing the phase from the retransformed, complex valued, time signal, it is especially important to prevent phase jumps, in order so to reconstruct the linearly growing phase correctly.

However, the reconstructed phase difference still includes distortions, which are caused by the dispersion in the case of the wave propagation in the pipe or tube. These dispersive effects are lessened, respectively eliminated, in the mixer stage 611 following thereon. In the mixer stage 611, there is impressed on the time signal a phase correction $\varphi_{z,corr}$, which is given by the above derived Equation (21):

$$\varphi_{z,corr}(t) = 2\pi \frac{2R}{c} \cdot \left( \sqrt{(f_0 + St)^2 - \hat{f}_c^2} - \sqrt{f_0^2 - \hat{f}_c^2} \right) - 2\pi \frac{2RS}{v_{const}} \cdot t \quad (21)$$

This phase correction is designed to remove dispersion effects completely or partially. For the so obtained phase corrected time signal, in the following step 612, a linear regression of the phase is performed. The phase $\varphi_c(t)$ of the phase corrected time signal rises essentially linearly with time:

$$\varphi_c(t) \approx 2\pi \frac{2RS}{v_{const}} \cdot t \quad (33)$$

Thus, the phase slope $$2\pi \frac{2RS}{v_{const}}$$

is proportional to the distance R to the target.

The farther away the target, the steeper is the slope. By means of the linear regression in step 612, the distance R to the target can, consequently, be directly derived.

In step 613, it is checked whether the ascertained distance R to the target is already sufficiently exact, or whether, for additionally increasing the accuracy, more iterations should be performed. In case more iterations are performed, the just ascertained distance R to the target is used as starting point for a renewed determining of the dispersion correction $\varphi_{z,corr}$ in step 614. The so determined phase correction is applied to the time signal in the mixer stage 611, and for the so obtained phase corrected signal then, again, a linear regression analysis is performed for ascertaining the phase slope. Now a more accurate value of the distance to the target can be derived from the phase slope, in order to form a basis for a new determination of the dispersion correction in step 614. By iterative determining of phase slope, distance to the target and dispersion correction, these variables can be determined with a desired accuracy. As soon as it is ascertained in step 613 that the distance to the target has been ascertained with sufficiently high accuracy, the iterations are stopped. As a result, one obtains in step 615 a very exact value of the distance to the target, thus the distance between the radar measuring device and the surface of the medium.

Figure 7:
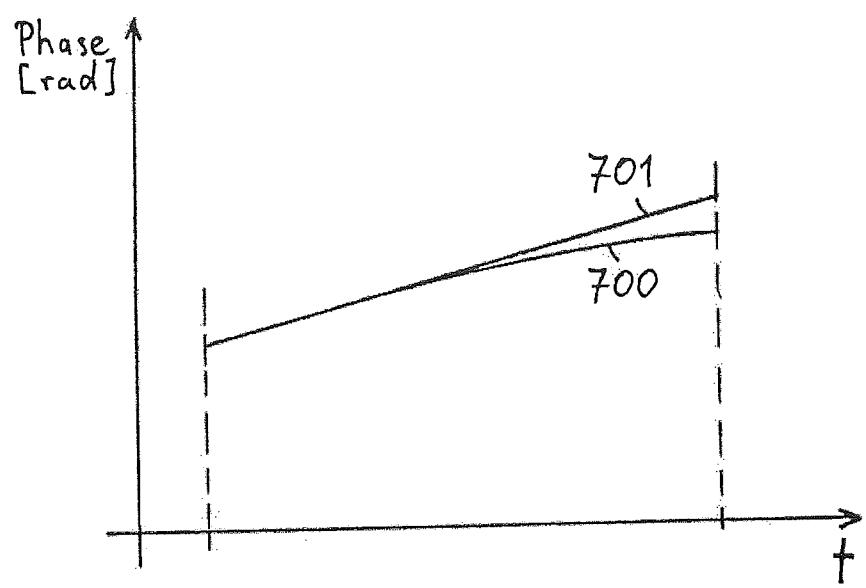
FIG. 7 phase as a function of bandpass filtered time signal before and after application of the dispersion correction.

FIG. 7 shows both the phase 700 before the application of the dispersion correction as well as also the dispersion corrected phase 701, both plotted as functions of time. Actually, the phase of the time signal should increase linearly with time. As a result of the dispersive effects, the phase 700 before the application of the dispersion correction has, however, a certain curvature, respectively distortion. This curvature, respectively distortion, is eliminated by application of the phase correction $\varphi_{z,corr}$, and one obtains the phase corrected phase 701, in the case of which the phase rises linearly with time. Preferably, the phase is corrected and linearized in a number of iterations. From the phase slope of the corrected phase plot 701, then the distance R to the target can be ascertained with high accuracy.

Superimposing a Number of Modes with Different Propagation Behaviors

To this point, the case has been discussed, in which essentially only a single mode is excited to any significant extent. Now the case will be discussed, in which the excitation energy is divided between a number of different modes, each of which propagates with a different propagation behavior in the pipe or tube. Thus, a mixture of a number of modes is excited, and the in-coupled energy is distributed among a number of modes. Each of the excited $TE_{m,n}$ and $TM_{m,n}$ modes is characterized by a different propagation behavior. For instance, each of the excited $TE_{m,n}$ and $TM_{m,n}$ modes possesses its own cutoff frequency $\hat{f}_{c,mn}$.

Corresponding to Equation (21), an associated phase correction $\varphi_{z,corr,j}(t)$ can be given for each excited mode j as follows:

$$\varphi_{z,corr,j}(t) = \qquad (34)$$

$$2\pi \frac{2R}{c} \cdot \left( \sqrt{(f_0 + St)^2 - \hat{f}_{c,mn}^2} - \sqrt{f_0^2 - \hat{f}_{c,mn}^2} \right) - 2\pi \frac{2RS}{v_{const}} \cdot t$$

In such case, $\hat{f}_{c,mn}$ is the respective cutoff frequency of the mode j. The first term serves to lessen, respectively eliminate, the dispersive effects of the respective mode j. The second term serves to add a phase rising linearly with time.

The phase corrections for the different excited modes are then phase correctly summed up. The individual correction signals $z_{corr,j}(t)$ for the individual modes result as follows:

$$z_{corr,j}(t) = \cos(\varphi_{z,corr,j}(t)) \qquad (35)$$

The entire correction signal $z_{corr,sum}(t)$ is obtained from the weighted addition of the individual correction signals $z_{corr,j}(t)$ for the individual modes:

$$z_{corr,sum}(t) = \sum_{TE_{m,n}, TM_{m,n}} w_j \cdot z_{corr,j}(t) \qquad (36)$$

The individual correction signals $z_{corr,j}(t)$ are weighted with associated amplitude weighting factors $w_j$ corresponding to their contribution to the total signal. The so obtained total correction signal $z_{corr,sum}(t)$ is designed to lessen or to remove for each mode the dispersion dependent phase fraction caused by the respective mode in the phase of the intermediate signal. Moreover, there is added to the phase a non-dispersion dependent term, which rises linearly with time. The correction signal $z_{corr,sum}(t)$ can then be used for correction of the measured signal:

$$\hat{z}_{phase\ corrected}(t) = \text{Re} \left\{ \frac{H\{z_{measured}(t)\}}{H\{z_{corr,sum}(t)\}} \right\} \qquad (37)$$

The invention claimed is:

1. A radar measurement apparatus for determining distance to a surface of a medium or to another radar target in a pipe or tube, wherein the radar measurement apparatus works according to the FMCW principle, and comprises:
   a radar transmission unit, which is designed to produce a radar transmission signal, which is frequency modulated according to the FMCW principle; and
   a radar receiving unit, which is designed to receive a radar received signal reflected on the surface of the medium or other radar target back in the pipe or tube, to convert the radar received signal by mixing with the radar transmission signal, or a signal derived therefrom, into an intermediate frequency signal and based on the so obtained intermediate frequency signal to determine a distance to the surface of the medium or to another radar target in the pipe or tube, wherein:
   said radar receiving unit is designed to apply a phase correction to the phase of the intermediate frequency signal and to produce a phase corrected, intermediate frequency signal, the phase correction is designed to lessen, or to remove, a dispersion dependent phase fraction in the phase of the intermediate frequency signal and to add a phase fraction not dependent on dispersion effects; and
   said radar receiving unit is designed based on the phase corrected intermediate frequency signal to determine target frequency components in the intermediate frequency signal and based on the target frequency components to determine distance to the surface of the medium or to other radar targets in the pipe or tube.

2. The radar measurement apparatus as claimed in claim 1, wherein:
   radar measurement apparatus is designed to apply at least one of the following operations to the intermediate frequency signal:
   removing a DC fraction from the intermediate frequency signal;
   transforming the intermediate frequency signal into a complex signal by means of a Hilbert transformation;
   performing a Fourier transformation for producing a frequency spectrum of the intermediate frequency signal; and
   detecting target frequency components in the frequency spectrum of the intermediate frequency signal.

3. The radar measurement apparatus as claimed in claim 1, wherein:
   at least one of the following applies:
   the radar measurement apparatus is designed to apply to the intermediate frequency signal a device-specific correction, which is provided to take into consideration a device specific transfer behavior of the radar measurement apparatus;
   the radar measurement apparatus is designed to apply to the intermediate frequency signal a device-specific correction, which is provided to take into consideration a device specific transfer behavior of the radar measurement apparatus, wherein the device-specific correction is determinable by means of a reference measurement to a reference target; and
   the radar measurement apparatus is designed to apply to the intermediate frequency signal a device-specific correction, wherein for producing the device-specific correction the transmission path between radar measurement apparatus and radar target is divided into a non-dispersion burdened path portion and a dispersion burdened path portion.

4. The radar measurement apparatus as claimed in claim 1, wherein:
   the phase correction depends on distance to the surface of the medium or distance to another radar target in the pipe or tube.

5. The radar measurement apparatus as claimed in claim 4, wherein:
   at least one of the following applies:
   said radar receiving unit is designed to determine the phase correction based on an estimated value of distance to the surface of the medium or distance to another radar target in the pipe or tube;
   said radar receiving unit is designed in the case of a first determining of the phase correction to use an estimated value for the distance to the surface of the medium or distance to another radar target in the pipe or tube; and
   said radar receiving unit is designed in the case of a first determining of the phase correction to use an estimated value for the distance to the surface of the medium or distance to another radar target in the pipe or tube and then to apply the so determined phase correction to the intermediate frequency signal.

6. The radar measurement apparatus as claimed in claim 5, wherein:

at least one of following applies:
said radar receiving unit is designed to ascertain the estimated value by evaluating target frequency components of the original, non-phase corrected, intermediate frequency signal; and
said radar receiving unit is designed to determine distance to the surface of the medium or distance to another radar target in the pipe cyclically recurringly and to derive from previously determined values of the distance an estimated value of the distance, which serves then as basis for determining the phase correction.

7. The radar measurement apparatus as claimed in claim 4, wherein:
said radar receiving unit is designed to determine mutually dependently by means of an iterative method the phase correction dependent on distance and the phase correction dependent distance to the surface of the medium or distance to another radar target in the pipe or tube.

8. The radar measurement apparatus as claimed in claim 4, wherein:
said radar receiving unit is designed alternately and mutually dependently to execute two steps as follows:
newly determining the phase correction based on a newly determined value of distance and then applying the newly determined phase correction to the intermediate frequency signal; and
newly determining the value of distance based on an analysis of target frequency components in the newly determined phase corrected, intermediate frequency signal.

9. The radar measurement apparatus as claimed in claim 4, wherein:
said radar receiving unit is designed to determine phase correction and distance iteratively mutually dependently until both phase correction as well as also distance are determined within a predetermined accuracy.

10. The radar measurement apparatus as claimed in claim 1, wherein:
at least one of following applies:
the phase correction includes a dispersion dependent term, which is designed to lessen or to remove the dispersion dependent phase fraction in the phase of the intermediate frequency signal;
the phase correction includes a dispersion dependent term, which is designed to lessen or to remove the dispersion dependent phase fraction in the phase of the intermediate frequency signal, wherein the dispersion dependent term has a phase correction of the following form:

$$2\pi \frac{2R}{c} \cdot \left( \sqrt{(f_0 + St)^2 - \hat{f}_c^2} - \sqrt{f_0^2 - \hat{f}_c^2} \right),$$

wherein R is distance to the surface of the medium or distance to another radar target in the pipe, wherein c is the speed of light in air, wherein $f_0$ is the starting frequency of the frequency ramp and S the slope of the frequency ramp of the radar transmission signal, and wherein $\hat{f}_c$ is the cutoff frequency of a dominating mode in the pipe or tube;
a non-dispersion effects dependent phase fraction, which is added by the phase correction, rises linearly with time;
the non-dispersion effects dependent phase fraction, which is added by the phase correction, depends on distance to the surface of the medium or distance to another radar target in the pipe or tube;
the phase correction includes a non-dispersion dependent term, which is designed to add the non-dispersion effects dependent phase fraction to the phase of the intermediate frequency signal, wherein the non-dispersion effects dependent phase fraction rises linearly with time;
the phase correction includes a non-dispersion dependent term, which is designed to add the non-dispersion effects dependent phase fraction to the phase of the intermediate frequency signal, wherein the non-dispersion effects dependent phase fraction depends on distance to the surface of the medium or distance to another radar target in the pipe or tube; and
the phase correction includes a non-dispersion dependent term, which is designed to add the non-dispersion effects dependent phase fraction to the phase of the intermediate frequency signal, wherein the non-dispersion dependent term of the phase correction has a form as follows:

$$-2\pi \frac{2RS}{v_{const}} \cdot t,$$

wherein R is distance to the surface of the medium or distance to another radar target in the pipe or tube, wherein S is the slope of the frequency ramp of the radar transmission signal, and wherein $v_{const}$ is a radar transmission signal propagation velocity, which is freely determinable.

11. The radar measurement apparatus as claimed in claim 1, wherein:
the radar measurement apparatus is designed to apply at least one of the following operations to the intermediate frequency signal:
removing a DC fraction from the intermediate frequency signal;
transforming the intermediate frequency signal into a complex signal by means of a Hilbert transformation;
performing a Fourier transformation of the intermediate frequency signal for producing a frequency spectrum of the intermediate frequency signal;
determining a relevant target frequency component, which corresponds to distance to the surface of the medium or distance to another radar target in the pipe or tube;
establishing a bandpass filter for a relevant target frequency component, wherein the bandpass filter is designed to pass the relevant target frequency component and to suppress other target frequency components;
bandpass filtering the frequency spectrum of the intermediate frequency signal and producing a bandpass filtered frequency spectrum;
performing an inverse Fourier transformation of a bandpass filtered frequency spectrum and producing a cleaned intermediate frequency signal; and
determining a phase slope in the phase of a cleaned intermediate frequency signal.

12. The radar measurement apparatus as claimed in claim 1, wherein:
the radar measurement apparatus is designed to apply at least one of the following operations to the intermediate frequency signal:

determining a phase slope in the phase of the cleaned intermediate frequency signal;

determining from the phase slope in the phase of the cleaned intermediate frequency signal distance to the surface of the medium or distance to another radar target in the pipe or tube;

newly determining the phase correction based on the newly determined distance; and applying the newly determined phase correction to the cleaned intermediate frequency signal.

13. The radar measurement apparatus as claimed in claim 1, wherein:

at least one of following applies:

propagation of a radar signal in the pipe or tube occurs essentially according to a dominating mode; and mode $TE_{01}$ is present as dominating mode for propagation of the radar signal in the pipe or tube.

14. The radar measurement apparatus as claimed in claim 1, wherein:

at least one of following applies:

propagation of a radar signal in the pipe or tube occurs according to a plurality of different modes;

propagation of a radar signal in the pipe or tube occurs according to a plurality of different modes, and the phase correction is designed to lessen or to remove for each mode a dispersion dependent phase fraction in the phase of the intermediate frequency signal caused by such mode; and propagation of a radar signal in the pipe occurs according to a plurality of different modes, and the phase correction is designed to add to the phase a non-dispersion effects dependent term, which rises linearly with time.

15. The radar measurement apparatus as claimed in claim 1, wherein:

at least one of following applies:

the medium is a liquid or bulk good;

the pipe or tube is a sounding tube or bypass tube;

said radar receiving unit is designed to determine from the distance to the surface of the medium a fill level of the medium in the pipe or tube;

the radar measurement apparatus is embodied as a field device, which is connectable with a control unit via a fieldbus; and the radar measurement apparatus is a fill-level measuring device for process automation.

16. A method for determining distance to a surface of a medium or distance to another radar target in a pipe or tube by means of a radar measurement apparatus, which works according to the principle of FMCW radar, wherein the method comprises:

transmitting a radar transmission signal within the pipe or tube, wherein the radar transmission signal is frequency modulated according to the FMCW principle;

receiving a radar received signal reflected on a surface of the medium or other radar target in the pipe or tube back to the radar measurement apparatus;

mixing the radar received signal with the radar transmission signal or a signal derived therefrom and producing an intermediate frequency signal;

applying a phase correction to the phase of the intermediate frequency signal and producing a phase corrected intermediate frequency signal, wherein the phase correction, on the one hand, lessens or eliminates a dispersion dependent phase fraction in the phase of the intermediate frequency signal and, on the other hand, adds a non-dispersion effects dependent phase fraction to the phase of the intermediate frequency signal; and determining target frequency components contained in the phase corrected, intermediate frequency signal and determining distance to the surface of the medium or to another radar target in the pipe or tube based on the target frequency components.

17. The method as claimed in claim 16, further comprising at least one of the following:

removing a DC fraction from the intermediate frequency signal;

transforming the intermediate frequency signal into a complex signal by means of a Hilbert transformation;

performing a Fourier transformation for producing a frequency spectrum of the intermediate frequency signal; and detecting target frequency components in the frequency spectrum of the intermediate frequency signal.

18. The method as claimed in claim 16, wherein:

the phase correction depends on distance to the surface of the medium or distance to another radar target in the pipe.

19. The method as claimed in claim 18, further comprising:

determining the phase correction based on an estimated value of distance to the surface of the medium or distance to another radar target in the pipe or tube;

when first determining the phase correction, using an estimated value for distance to the surface of the medium or distance to another radar target in the pipe or tube; and when first determining the phase correction, using an estimated value for distance to the surface of the medium or distance to another radar target in the pipe or tube and then applying the so determined phase correction to the intermediate frequency signal.

20. The method as claimed in claim 18, wherein:

the phase correction dependent on distance and the phase correction dependent distance to the surface of the medium or distance to another radar target in the pipe or tube are determined mutual dependently by means of an iterative method.

21. The method as claimed in claim 17, wherein:

alternately and mutual dependently two steps are executed as follows:

newly determining the phase correction based on a newly determined value of distance and then applying the newly determined phase correction to the intermediate frequency signal; and newly determining the value of the distance based on an analysis of target frequency components in the newly determined, phase corrected, intermediate frequency signal.

* * * * *